United States Patent [19]
Alahapperuma et al.

[11] Patent Number: 6,027,778
[45] Date of Patent: Feb. 22, 2000

[54] ONE PIECE CAPSTAN FOR A TAPE CARTRIDGE

[75] Inventors: Karunasena A. Alahapperuma, Maplewood; Anthony B. Ferguson, Lake Elmo, both of Minn.; David P. Smith, Hudson; David L. Tussey, New Richmond, both of Wis.; Saurin J. Shah, Woodbury, Minn.; Dean E. Sitz; Randy S. Bay, both of Wahpeton, N. Dak.; Daniel C. Egan, Oakdale, Minn.; Wolfgang G. Schoeppel, Neuss, Germany

[73] Assignee: Imation Corp., Oakdale, Minn.

[21] Appl. No.: 08/306,770

[22] Filed: Sep. 15, 1994

[51] Int. Cl.[7] .............................. B65H 20/00; G03B 1/04; G11B 15/32

[52] U.S. Cl. .................. 428/35.7; 428/34.1; 428/36.92; 242/346.2; 242/352.4; 242/900; 242/906; 226/190; 474/166

[58] Field of Search .............................. 242/346.2, 352.4, 242/900, 906, 343.2; 226/190; 474/166; 428/34.1, 35.7, 36.9, 36.92

[56] References Cited

U.S. PATENT DOCUMENTS

| | | |
|---|---|---|
| 3,829,040 | 8/1974 | Nelson ................................. 242/346.2 |
| 4,254,923 | 3/1981 | Ishida et al. ............................ 226/190 |
| 4,640,473 | 2/1987 | Aoyama ................................ 242/346.2 |
| 5,219,493 | 6/1993 | Seshadri ................................ 252/500 |
| 5,221,061 | 6/1993 | Nishioka et al. ..................... 242/346.2 |
| 5,362,009 | 11/1994 | Howard, Jr. et al. ................ 242/346.2 |
| 5,416,659 | 5/1995 | Saitou et al. ........................ 242/352.4 |
| 5,454,501 | 10/1995 | Konno et al. ............................ 226/190 |

FOREIGN PATENT DOCUMENTS 55-160353  12/1980  Japan .

*Primary Examiner*—Rena L. Dye

[57] ABSTRACT

The present invention provides a novel one-piece capstan for a tape cartridge which provides good static dissipative properties and wear resistance. The capstan material of the present invention has a charge decay time of no more than 5 seconds as measured according to Mil B-81705C standard. The capstan material also has a flexural modulus of at least 200,000 psi (1379 MPa). The capstan comprises a hard, dimensionally stable polymer and a static dissipating polymer. The capstan also has an improved structure and geometry which enables the part to be easily molded, reduces drive force requirements with a reduction of material from the prior art design, but with no significant loss of performance properties.

27 Claims, 2 Drawing Sheets

ONE PIECE CAPSTAN FOR A TAPE CARTRIDGE

BACKGROUND OF THE INVENTION

1. Technical Field

The present invention concerns a tape cartridge in which a flexible, elastic drive belt contacts the tape which is wound on tape spools and whereby movement of the belt causes movement of the tape between the spools.

2. Background Information

Belt driven tape cartridges are frequently used to interface with computers where rapid acceleration and deceleration of the tape are required. U.S. Pat. No. 3,692,255 disclosed such a patent in which the magnetic recording tape is convolutely wound on two tape spools by an endless flexible belt in frictional contact with the tape on both spools. The endless flexible belt is wrapped around and driven by a capstan within the cartridge. The capstan itself is driven by a motor drive roller or drive puck which is external to the cartridge and is a portion of a recording/playback tape recorder mechanism into which the cartridge is inserted. The motor drive roller engages the capstan by means of an access opening provided in a wall of the cartridge.

Unfortunately, during operation of the cartridge, a static electric charge builds up on the capstan from the frictional contact between the motor drive roller and the capstan. If this static electric charge is not dissipated, a sudden discharge may result which may cause erroneous signals in the electronics of the tape recorder mechanism. In addition, it is important to produce the capstan of materials that can withstand the friction caused between the capstan and its mounting pin, the capstan and the cartridge surfaces, the capstan and the drive puck, and the capstan and the drive belt during operation.

Metal capstans, which would generally satisfy both the charge dissipation and wear resistance requirements of the capstan, are generally considered too expensive and may contribute to charge build-up on other tape cartridge components. Attempts have been made in the past to use polymers which had been made conductive by the addition of relatively large amounts of carbon. These capstans frequently did not display adequate wear resistance.

U.S. Pat. No. 4,607,808 attempted to solve the problem by using a two piece capstan design. The inner sleeve which surrounds the mounting pin included a polytetrafluoroethylene-filled acetal resin, while the remainder of the capstan comprised a carbon-filled acetal resin. Such a two piece design presents more difficulties in manufacture than a one piece design, thus an inexpensive, wear resistant, and charge dissipating one piece capstan design was desirable. International Patent Publication WO 91/13017 purports to have achieved a one piece, wear resistant, charge dispersing tape cartridge capstan comprising a resin matrix having a carbon fiber component and a fluorocarbon component therein.

Throughout these various modifications the geometry or structure of capstans remained substantially the same.

SUMMARY OF THE INVENTION

The present invention provides a novel one-piece capstan for a tape cartridge. According to a first embodiment, the present invention is a capstan having an improved structure and geometry which enable the capstan to be easily molded, with a reduction of material from the prior art design, but with no significant loss of performance properties. Specifically, this embodiment is a one piece capstan for a tape cartridge comprising a) a central hub having a first and a second end;

b) a belt supporting means having a first and a second end, said belt supporting means being concentric with the central hub and having a diameter greater than that of the central hub;

c) a web connecting the central hub to the belt supporting means, said web is located so that it is closer to the first end of the central hub and the belt supporting means than is the portion of the belt supporting means which contacts the drive belt; and d) a drive contacting means attached to the first end of the belt supporting means and having a diameter greater than that of the belt supporting means. Preferably, the material used in the capstan of the present invention has a charge decay time of no more than 5 seconds, preferably no more than 2 seconds, more preferably less than 1 second, as measured according to Mil B-81705C standard. The capstan material preferably also has a flexural modulus of at least 200,000 psi (1379 MPa), preferably 200,000–500,000 psi (1379–3347 MPa), and more preferably 220,000–280,000 psi (1516–1930 MPa).

In a second embodiment the capstan comprises a hard, dimensionally stable polymer and a static dissipating polymer. Preferably the capstan comprises a) 5–35% by weight of a static dissipative polymer;

b) 40–95% by weight of a hard, durable base polymer;

c) 0–30% by weight of a fluorinated polymer; and d) 0–30% by weight of an inorganic filler material.

DETAILED DESCRIPTION OF THE INVENTION

Figure 1:
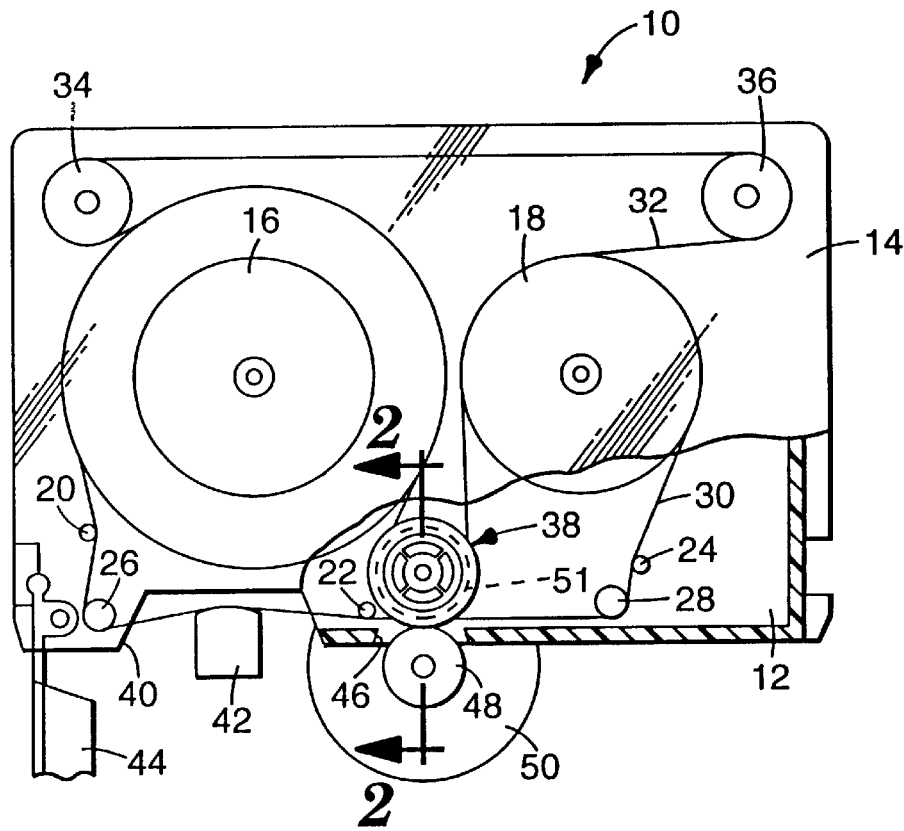
FIG. 1 is a top plan view of a representative belt driven tape cartridge.

FIG. 1 illustrates a representative data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving capstan 38.

The tape spools 16 and 18 are supported by the cartridge base plate 12 for free rotation about spaced parallel axes. The magnetic recording tape 30 is convolutely wound on the tape spools 16 and 18 in opposite directions about their axes. The tape 30 guide path between the tape spools 16 and 18 is defined by the three tape wrap pins 20, 22, and 24 and the two tape guides 26 and 28.

The cartridge 10 is formed with a recess 40 along the tape path which provides access to the magnetic tape 30 by a magnetic transducer 42. The recess 40 is normally closed by a spring-loaded door 44 which is opened as shown upon insertion of the data cartridge 10 into a tape recorder (not shown). An opening 46 is provided in the cartridge cover 14 to provide access to the belt driving capstan 38 by a drive puck 48 driven by a reversible motor 50. The magnetic transducer 42, the drive puck 48 and the reversible motor 50 form a portion of the tape recorder rather than the data cartridge 10.

The cartridge belt driving capstan 38 is provided with a reduced diameter 51 to prevent contact between the driving belt 32 and the drive puck 48. The driving belt 32 is thin, continuous, flexible and elastic. It has a uniform cross-sectional area and extends around the belt driving capstan 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving capstan 38 in a counterclockwise direction (as viewed in FIG. 1) by the drive puck 48 causes the belt 32 to traverse its path in a counterclockwise direction and the tape 30 to move from the tape spool 18 to the tape spool 16, the tape spool 18 serving as a supply spool and the tape spool 16 serving as a take-up spool. Opposite rotation of the driving capstan 38 by the drive puck 48 will cause tape to be supplied by the tape spool 16 and convolutely wound upon the tape spool 18. A predetermined frictional coupling between the belt guide rollers 34 and 36 and their respective support shafts applies a predetermined drag to the belt 32 as it passes around the guide rollers 34 and 36, thereby increasing the tension of the belt 32 as it passes around each of the belt guide rollers 34 and 36. This increased tension in the belt 32 increases the length of the belt 32 according to its elasticity and thereby the speed at which the belt 32 passes around one spool 16 or 18 is increased compared to that at which it passes around the other spool 16 or 18. This increased speed causes tension in the tape 30 as well as the ability to take up any slack developed in the tape 30 between the tape spools 16 and 18 as is more fully taught in U.S. Pat. No. 3,692,255.

Figure 2:
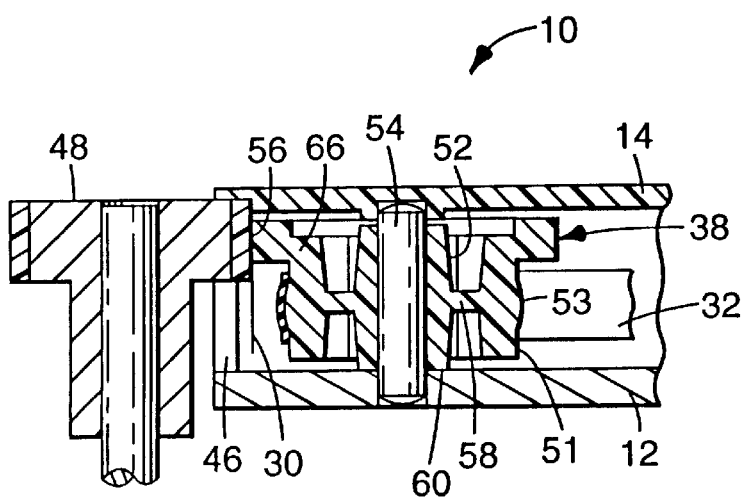
FIG. 2 is a cross sectional view of a prior art capstan, a drive puck, and a portion of a cartridge.
Figure 3:
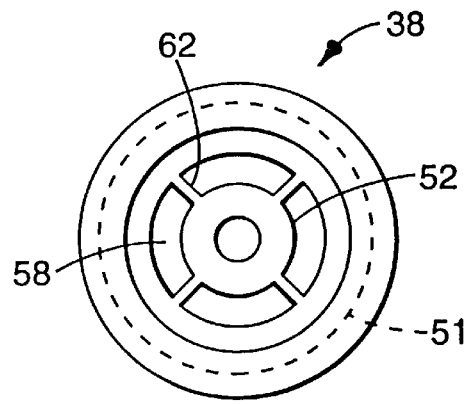
FIG. 3 is a top view of a representative prior art capstan.

FIG. 2 is a cross-sectional view of a prior art capstan similar to those disclosed in U.S. Pat. No. 3,692,255 and International Patent Publication WO 91/13017. The inner diameter of the hub 52 in prior art capstans has typically been about 0.125 in (0.319 cm). The drive puck 48 contacts the capstan along the drive contacting means 56. The belt supporting means 51 is roughly cylindrical and is concentric with the hub 52. Note that the belt supporting means 51 has a slight bulge or crown 53 where the drive belt 32 contacts the capstan. This crown 53 prevents the drive belt 32 from travelling vertically on the capstan. The drive contacting means 56 is preferably located at the top of the belt supporting means 51 and has a diameter greater than that of the belt supporting means 51. The belt supporting means 51 is connected to the hub 52 by a web 58 and by supporting ribs 62 (shown in FIG. 3), which run from the top to the bottom of the hub 52. The supporting ribs increased physical strength of the capstan. The web 58 is located at the level along the hub 52 and the belt supporting means 51 where the drive belt 32 contacts the belt supporting means 51. In other words the web 58 is collinear with the crown 53. The portions which experience the majority of the wear are between the hub 52 and the pin 54 around which the hub rotates, at the interface 60 between the hub 52 and the base plate 12, and between the drive contacting means 56 and the drive puck 48.

Figure 4:
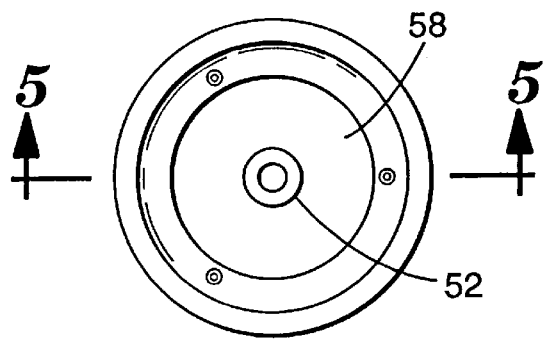
FIG. 4 is a top view of a representative capstan according to the present invention.
Figure 5:
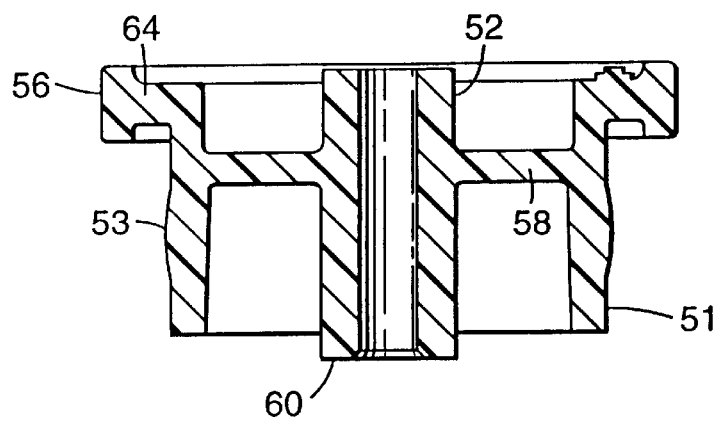
FIG. 5 is a cross sectional view of a representative capstan according to the present invention.

FIGS. 4 and 5 illustrate a representative embodiment of the inventive capstans. In this embodiment, the web 58 has been moved up the hub so that it is no longer co-linear with the crown 53, i.e. it is no longer at the level where the drive belt 32 contacts the capstan at the crown 53. The web now connects to the hub and the belt supporting means somewhere along the top half of the hub and the belt supporting means. This relocation of the web limits the flexing of the capstan caused by pressure from the drive puck. However, according to a preferred embodiment the distance of the web from the top of the capstan is no less than one fifth, preferably one quarter of the entire height of the capstan. If the web is too high on the capstan difficulties may arise during molding of the capstan. Also a lower web may serve as a catch for lubricant which is migrating from the capstan/pin interface.

FIG. 5 shows that the drive contacting means 56 is connected to the belt supporting means 51 by T-shaped connecting means 64. The T-shape connecting means allows use of thinner walls, which correspond approximately to the thickness of the web 58, hub 52, and belt supporting means 51, rather than the block shaped connecting means 66 shown in FIG. 2. Moreover, the T-shape connecting means avoids the problems of deflection which are experienced with cantilever type connecting means.

In addition, as FIG. 4 shows, the inventive capstans have no supporting ribs. Elimination of ribs gives improved roundness due to improved flow of the material during molding and due to more even shrinkage as the part is cooling after molding. The elimination of the ribs also prevents uneven compression of the capstan as it rotates in contact with the drive puck. The improved roundness and even compression, in turn, reduce internal vibrations which may be generated during operation of the tape cartridge. The capstan without the ribs remains strong enough to bear the forces of the drive puck and the drive belt. Use of this modified geometry enables a material reduction of up to about 45–50% by weight without a loss of mechanical performance properties.

Finally, the inner diameter of the hub 52 in the inventive capstan has been reduced. The inner diameter is now no more than 0.11 inch, preferably no more than 0.1 inches. Decreasing the inner diameter while maintaining a constant clearance between the pin and the inner hub surface has been found to reduce drive force. The minimum inner diameter for the hub 52 of the capstan is determined by material properties, such as strength of the pin 54 and type of material used in the base plate 12, which holds the pin.

In another preferred embodiment, the material for the capstan is a polymeric composition. The composition comprises a hard, durable base polymer and a static dissipating or conducting polymer. Static dissipating polymers, also referred to as polymeric antistatic additives, contain ionic or polar groups which provide the static dissipative or antistatic properties. Examples of static dissipating polymers include polyethylene glycol derivatives (such as condensation products of polyethylene glycol and diisocyanates), see e.g. U.S. Pat. No. 5,198,521; polymers containing acrylic esters and polyethylene oxide chains; acrylic polymers having vinyl monomers with quaternary ammonium pendant groups; acrylic polymers containing salts of acrylic acids; polyaniline; and polyvinyl pyrrole. Ionic salts, preferably Lithium salts, can be used to enhance the charge dissipative properties of polyethyleneglycol derivatives. Polyethylene glycol derivatives having amide and ester bonds are preferred. Non-limiting commercially available examples of static dissipating polymers include StatRite™ C-2200 and C-2300 (BF Goodrich). See also U.S. Pat. No. 5,077,330. Another preferred static dissipative polymer is found in Permastat™ (RTP Corp.) antistatic polymer blends which contain static dissipating or charge dissipating polymer. The amount of static dissipative polymer is preferably from 5–35%, more preferably 10–30%, most preferably 10–20%, by weight.

Preferred hard, durable base polymers include polyacetal, polyamides, and polybutylene terephthalates. Polyamides are preferred for wear purposes, and Nylon 6/12 is especially preferred. Polyacetals are preferred with respect to moldability. The amount of base polymer is preferably from 40–95%, more preferably about 65–90%, and most preferably, 80–90% by weight. The static dissipating polymer is distributed as a separate phase in the base polymer. We have observed that the static dissipative polymer phase may be distributed as spherical zones or particles, which are close enough to each other to effectively dissipate the charge. Actual physical contact of the zones of static dissipating polymer maximizes the charge dissipation properties.

Optionally, the polymeric composition further comprises up to 30%, preferably 0–20%, by weight of a fluorinated polymer. The fluorinated polymer serves as a lubricant between the bore of the hub and the pin. This is especially helpful to avoid undue wear if additional lubricant which is used migrates away from the bore/pin interface. Polytetrafluoroethylene is particularly useful. Inorganic fillers may optionally be used in amounts up to about 30%, preferably 0–20%, most preferably 0–10%, by weight. The inorganic fillers may serve as nucleating agents to increase the degree of crystallinity and decrease the size of the crystals. The use of inorganic fillers improves moldability by reducing cycle times and decreasing the amount of shrinkage after molding. Calcium carbonate is an example of a highly useful inorganic additive. Colorants may also be added if desired. Colorants are typically added in very small amounts that have no significant effect on charge dissipation and mechanical properties. The polymeric composition may be made by dry blending the ingredients followed by compounding in an extruder.

EXAMPLES

Example 1

Capstan, A, according to this invention were injection molded. These capstans contained a polymer blend comprising between 65 and 95% by weight Nylon 6/12 and between 5 and 35% by weight of a lithium salt doped static dissipating polymer. This blend was purchased from RTP Corp. The capstans also contained less than 0.5% carbon black powder colorant. This composition molded well.

Example 2

A second set of capstans, B, of this invention was produced by injection molding as in Example 1. These capstans were produced using an acetal base polymer. The blend of acetal base polymer and charge dissipating polymer is available from RTP Corp. under the name RTP 899×62769. Ninety two % by weight of the polymer blend was combined with 5% by weight PTFE and 3% by weight calcium carbonate. A small amount of carbon black powder colorant was also added. This composition molded well.

Example 3

The durability of 10 capstans each of A and B were tested for durability against the drive puck by inserting them in a 3M DC6150 data cartridge for 1,000 short shuffle passes at a tape speed of 120 in/sec. (305 cm/sec) in a 27° C. and 55% relative humidity environment. A short shuffle pass consists of repeatedly moving the tape 35 inches (89 cm) in the forward direction and then 7 inches (18 cm) in the reverse direction until the tape has completely moved from the beginning of the tape to the end of the tape or vice versa. The load applied by the drive puck against the capstan was maintained at 20 oz.+/−2 oz. (5.5 N+/−0.55 N). The acceleration of the tape during the short shuffle cycling is less than 1500 in/s$^2$ (3810 cm/s$^2$).

Also tested for comparative purposes were the following commercially available capstans: 6 Comparative Capstans C and 6 Comparative Capstans D. Comparative Capstan C is a one piece capstan containing acetal copolymer, about 10% by weight of carbon fibers, and about 5% by weight PTFE. Comparative Capstan D is a one piece capstan containing about 9% by weight carbon in an acetal base polymer.

Comparative Capstans C transferred a significant amount of black debris onto the drive puck. The debris collected into relatively large pieces which adhered to the drive puck in localized areas. Similarly, comparative capstans D transferred a significant amount of black debris onto the drive puck. With comparative capstans D there were both small string-like pieces and large molten collections of material. The debris was spread fairly evenly around the entire drive puck.

Inventive capstans B, using static dissipative polymer in an acetal base polymer, showed improved but inconsistent wear patterns. In most cases very little capstan material was transferred to the drive puck. However, about 10% of the capstans B transferred material to the drive puck in the manner of Comparative capstan C.

Inventive capstans A, using a Nylon base polymer, showed very little debris transfer and no large pieces or collections of debris. The small amount of debris that is transferred has a string-like appearance and is evenly distributed on the drive puck surface.

Example 4

Two sets of capstans were prepared having bore sizes of 0.1252 and 0.0947 in., respectively (0.3180 and 0.241 cm). These capstans were tested on various sized pins which provided nominal clearances between the pin and the bore from 0.0001 to 0.0026 in. (0.00025 to 0.00660 cm). The drag force of these capstans was tested by measuring the motor current required to turn the capstan when it is connected to the motor shaft by a non-stretch belt with 16 ounces (4.4 N) of belt tension at belt speeds of 120 in/sec (305 cm/sec). The drag force at each of the various clearances was approximately 70% lower for the 0.0947 in (0.241 cm) bore capstan than for the 0.1252 in (0.3180 cm) bore capstan.

Example 5

The capstans of example 4 were used in assembled tape cartridges varying only bore size and pin size. The belt tensions and minimum tape tensions were virtually identical for capstans of both bore sizes. However, the smaller bore size capstans showed 12% reduction of maximum drive force in the forward direction and 15% reduction of maximum drive force in the reverse direction at a tape speed of 120 in/sec.

What is claimed is:

1. A one piece capstan for a tape cartridge comprising
   a) a central hub having a first and a second end;
   b) a belt supporting means having a first and a second end and a belt contacting portion, said belt supporting means being concentric with the central hub and having a diameter greater than that of the central hub and;
   c) a web connecting the central hub to the belt supporting means, said web is located so that it is closer to the first end of the central hub and the first end of the belt supporting means than is the belt contacting portion of the belt supporting means; and
   d) a drive contacting means attached to the first end of the belt supporting means and having a diameter greater than that of the belt supporting means.

2. The capstan of claim 1 in which the material is a polymeric material having charge decay time of no more than 5 seconds and having a flexural modulus of at least 200,000 psi.

3. The capstan of claim 2 in which the polymeric material comprises a static dissipating polymer and a hard, durable base polymer.

4. The capstan of claim 3 in which the base polymer is selected from the group consisting of polyamides, polyacetals, and polybutyleneterephthalates.

5. The capstan of claim 3 in which the base polymer is Nylon 6/12.

6. The capstan of claim 3 in which the polymeric composition further comprises a fluoropolymer in amounts up to 30% by weight.

7. The capstan of claim 3 in which the polymeric composition further comprises an inorganic filler in amounts up to 30% by weight.

8. The capstan of claim 3 wherein the amount of base polymer is from 40 to 95 parts weight and the amount of static dissipative polymer is from 5 to 35 parts by weight.

9. The capstan of claim 1 wherein the inner diameter of the central hub is less than 0.11 inches.

10. The capstan of claim 1 wherein the drive contacting means is attached to the belt supporting means by a t-shaped connecting means.

11. The capstan of claim 3 wherein the static dissipative polymer is selected from the group consisting of polyethylene glycol derivatives; polymers containing acrylic esters and polyethylene oxide chains; acrylic polymers having vinyl monomers with quaternary ammonium pendant groups; acrylic polymers containing salts of acrylic acids; polyaniline; and polyvinyl pyrrole.

12. The capstan of claim 3 wherein the static dissipative polymer is a polyethylene glycol derivative.

13. The capstan of claim 3 wherein the static dissipative polymer is a polyethylene glycol derivative having amide and ester bonds.

14. The capstan of claim 11 wherein the static dissipative polymer further comprises an ionic salt.

15. The capstan of claim 14 wherein the ionic salt is a lithium salt.

16. The capstan of claim 1 wherein the web is located along the top 50% of the capstan.

17. The capstan of claim 16 wherein the distance of the web from the top of the capstan is at least one fifth of the height of the capstan.

18. The capstan of claim 17 wherein the distance of the web from the top of the capstan is at least one quarter of the height of the capstan.

19. A one piece capstan for a tape cartridge comprising
   a) 5–35% by weight of a static dissipative polymer;
   b) 40–95% by weight of a hard, durable base polymer;
   c) 0–30% by weight of a fluorinated polymer; and
   d) 0–30% by weight of an inorganic filler material.

20. The capstan of claim 19 in which the base polymer is selected from the group consisting of polyamides, polyacetals, and polybutyleneterephthalates.

21. The capstan of claim 19 in which the base polymer is nylon 6/12.

22. The capstan of claim 19 wherein the static dissipative polymer is selected from the group consisting of polyethylene glycol derivatives; polymers containing acrylic esters and polyethylene oxide chains; acrylic polymers having vinyl monomers with quaternary ammonium pendant groups; acrylic polymers containing salts of acrylic acids; polyaniline; and polyvinyl pyrrole.

23. The capstan of claim 19 wherein the static dissipative polymer is a polyethylene glycol derivative.

24. The capstan of claim 19 wherein the static dissipative polymer is polyethylene glycol derivative with ester and amide bonds.

25. The capstan of claim 22 wherein the static dissipative polymer further comprises an ionic salt.

26. The capstan of claim 25 wherein the ionic salt is a lithium salt.

27. The capstan of claim 19 wherein the inorganic filler is calcium carbonate.

* * * * *

UNITED STATES PATENT AND TRADEMARK OFFICE
CERTIFICATE OF CORRECTION

PATENT NO. : 6,027,778
DATED : February 22, 2000
INVENTOR(S) : Alahapperuma et al.

It is certified that error appears in the above-identified patent and that said Letters Patent is hereby corrected as shown below:

Title page,
Item [56], under U.S. PATENT DOCUMENTS, the following should be added:

-- 3,692,255   9/1972    Von Behren..........   242/343.2
   3,770,494   11/1973   Shichijo et al. ........   428/394
   3,852,255   12/1974   Bentz et al. ...........   524/199
   3,891,718   6/1975    Wolf et al. ............   524/220
   4,607,808   8/1986    Collins ...............   242/346.2
   5,077,330   12/1991   Ehrhart et al. ........   524/314
   5,198,521   3/1993    Ehrhart et al. ........   528/428 --

Under FOREIGN PATENT DOCUMENTS, the following should be added:

-- WO 91/13017    9/1991    PCT
   DE 3831769A1   9/1988    Germany --

After the FOREIGN PATENT DOCUMENTS section, the following should be added:

OTHER PUBLICATIONS

"Antistatic Compositions for Textiles and Plastics," Keith Johnson, Noyes Data Corporation, Park Ridge, New Jersey, 1976.
"Tape Design Means Longer Data Life," by Mark Ferelli, Computer Technology Review, Volume XIV, No. 5, May 1994
Drive Roller from Gigatek Memory Systems™ DC2120 Data Cartridge, March 17, 1994 --

Signed and Sealed this

Twenty-third Day of October, 2001

Attest:

*Nicholas P. Godici*

NICHOLAS P. GODICI
*Attesting Officer*   *Acting Director of the United States Patent and Trademark Office*